US011070862B2

(12) United States Patent
Everett et al.

(10) Patent No.: US 11,070,862 B2
(45) Date of Patent: Jul. 20, 2021

(54) SYSTEM AND METHOD FOR DYNAMICALLY PROVIDING PERSONALIZED TELEVISION SHOWS

(71) Applicant: AT&T INTELLECTUAL PROPERTY I, L.P., Atlanta, GA (US)

(72) Inventors: Sarah Everett, Cedar Park, TX (US); Gregory W. Edwards, Austin, TX (US); Marc Sullivan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/631,397

(22) Filed: Jun. 23, 2017

(65) Prior Publication Data

US 2018/0376187 A1    Dec. 27, 2018

(51) Int. Cl.
| | |
|---|---|
| H04N 21/2668 | (2011.01) |
| H04N 21/442 | (2011.01) |
| H04N 21/258 | (2011.01) |
| H04N 21/422 | (2011.01) |
| G06Q 30/02 | (2012.01) |
| H04N 21/45 | (2011.01) |

(52) U.S. Cl.
CPC ... *H04N 21/2668* (2013.01); *H04N 21/25883* (2013.01); *H04N 21/25891* (2013.01); *H04N 21/42201* (2013.01); *H04N 21/42202* (2013.01); *H04N 21/44213* (2013.01); *G06Q 30/02* (2013.01); *H04N 21/44222* (2013.01); *H04N 21/4508* (2013.01)

(58) Field of Classification Search
CPC ....... H04N 21/25883; H04N 21/25891; H04N 21/44213; H04N 21/234; H04N 21/23412; H04N 21/23418; H04N 21/258; H04N 21/25841; H04N 21/42201; H04N 21/4223; H04N 21/44016; H04N 21/4415; H04N 21/4524; H04N 21/4532; H04N 21/4622
USPC .......................................................... 725/34
See application file for complete search history.

(56) References Cited

U.S. PATENT DOCUMENTS

| | | | |
|---|---|---|---|
| 8,464,292 | B2 | 6/2013 | Xiao et al. |
| 8,713,606 | B2 | 4/2014 | Nichols et al. |
| 8,868,680 | B2 | 10/2014 | Gopalakrishna et al. |
| 8,955,010 | B2 | 2/2015 | Gurumoorthy et al. |
| 9,191,720 | B2 | 11/2015 | Wong |
| 9,305,373 | B2 | 4/2016 | Oesterreicher |

(Continued)

*Primary Examiner* — Nnenna N Ekpo
(74) *Attorney, Agent, or Firm* — Guntin & Gust, PLC; Mark Wilinski

(57) ABSTRACT

Aspects of the subject disclosure may include, for example, a method that includes obtaining, by a processing system including a processor, a user profile for a user of a media service, and selecting, in accordance with the user profile, program components for inclusion in a media program to be presented via the media service. The method also includes generating the media program using the selected program components, and presenting the media program at equipment of the user. The method also includes obtaining sensor data associated with the user, and determining a user engagement level during presentation of the media program, based on the sensor data. The method further includes adjusting at least one of the program components responsive to the user engagement level, thereby generating a modified media program for presentation to the user. Other embodiments are disclosed.

17 Claims, 12 Drawing Sheets

(56) References Cited

U.S. PATENT DOCUMENTS

| | | | |
|---|---|---|---|
| 2003/0093784 A1* | 5/2003 | Dimitrova | H04N 7/163 |
| | | | 725/10 |
| 2005/0160458 A1 | 7/2005 | Baumgartner | |
| 2005/0251842 A1 | 11/2005 | Benliyan | |
| 2009/0177528 A1* | 7/2009 | Wu | G06Q 30/02 |
| | | | 705/14.44 |
| 2010/0017455 A1 | 1/2010 | Svendsen et al. | |
| 2010/0114937 A1 | 5/2010 | Hawthorne et al. | |
| 2012/0324494 A1* | 12/2012 | Burger | H04H 60/33 |
| | | | 725/12 |
| 2013/0152113 A1* | 6/2013 | Conrad | H04N 21/42201 |
| | | | 725/12 |
| 2014/0270683 A1* | 9/2014 | Zhu | H04N 21/42202 |
| | | | 386/224 |
| 2014/0344103 A1 | 11/2014 | Zhu et al. | |
| 2015/0039620 A1 | 2/2015 | Ning | |
| 2015/0281783 A1* | 10/2015 | Laksono | H04N 21/4415 |
| | | | 725/10 |
| 2015/0302009 A1* | 10/2015 | Henderson | G06N 20/00 |
| | | | 707/609 |
| 2016/0015307 A1* | 1/2016 | Kothuri | A61B 5/167 |
| | | | 702/19 |
| 2016/0078489 A1 | 3/2016 | Hu et al. | |
| 2016/0274744 A1 | 9/2016 | Neumann et al. | |
| 2017/0045942 A1* | 2/2017 | Bostick | G06F 3/015 |
| 2017/0180799 A1* | 6/2017 | Dey | G06K 9/00892 |
| 2018/0115808 A1* | 4/2018 | Buga | H04N 21/44213 |
| 2018/0211285 A1* | 7/2018 | Todasco | G06Q 30/0269 |
| 2018/0220198 A1* | 8/2018 | Matthews | H04N 21/4532 |

* cited by examiner

600

700

800

SYSTEM AND METHOD FOR DYNAMICALLY PROVIDING PERSONALIZED TELEVISION SHOWS

FIELD OF THE DISCLOSURE

The subject disclosure relates to a system and method for providing television (TV) shows personalized to the viewer, and dynamically creating and/or modifying a television show to meet the viewer's preferences.

BACKGROUND

Television shows typically are produced and broadcast so that the same video content is presented to all viewers, regardless of viewers' personalities, preferences or situations. In general, television shows are presented without dynamic adaptation to the viewer, and without real-time feedback to the provider of the show.

BRIEF DESCRIPTION OF THE DRAWINGS

Reference will now be made to the accompanying drawings, which are not necessarily drawn to scale, and wherein.

DETAILED DESCRIPTION

Figure 1:
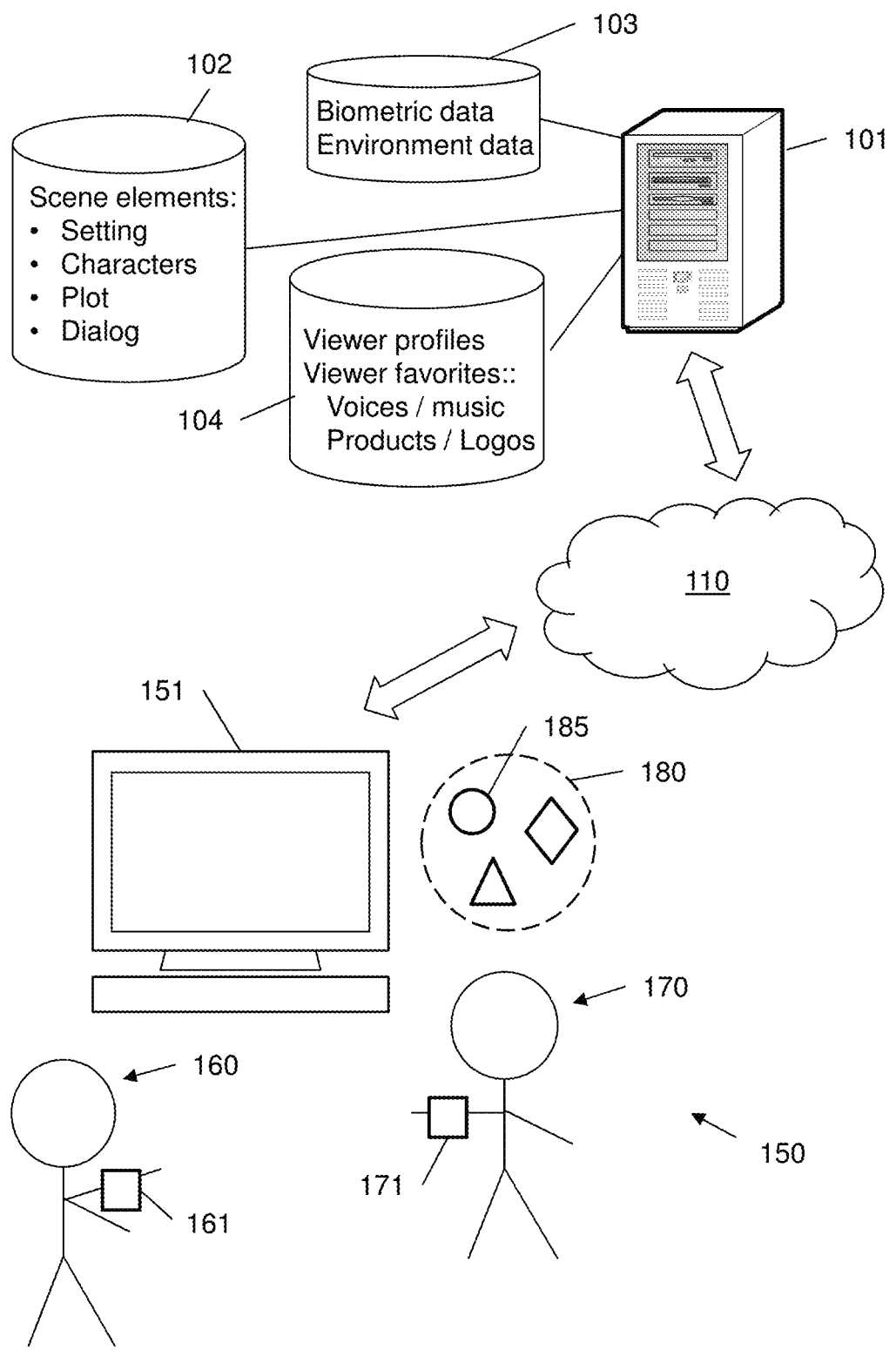
FIG. 1 schematically illustrates a system for dynamically providing personalized TV shows, in accordance with embodiments of the disclosure.

The subject disclosure describes, among other things, illustrative embodiments for creating and dynamically altering a media program presentation, based on a profile and real-time data regarding a viewer of the media program. Other embodiments are described in the subject disclosure.

One or more aspects of the subject disclosure include a device that comprises a processing system including a processor and a memory that stores executable instructions that, when executed by the processing system, facilitate performance of operations. The operations comprise obtaining a user profile for a user of a media service, and selecting, in accordance with the user profile, program components for inclusion in a media program to be presented via the media service; the program components comprise backgrounds, characters, plot elements, spoken dialogue, music, props, product placements, or combinations thereof. The operations also comprise generating the media program using the selected program components, presenting the media program at equipment of the user, obtaining sensor data associated with the user, and determining a user engagement level during presentation of the media program, based on the sensor data. The operations further comprise adjusting at least one of the program components responsive to the user engagement level, thereby generating a modified media program for presentation to the user.

One or more aspects of the subject disclosure include a method comprising obtaining, by a processing system including a processor, a user profile for a user of a media service, and selecting, in accordance with the user profile, program components for inclusion in a media program to be presented via the media service. The method also comprises generating the media program using the selected program components, and presenting the media program at equipment of the user. The method also comprises obtaining sensor data associated with the user, and determining a user engagement level during presentation of the media program, based on the sensor data. The method further comprises adjusting at least one of the program components responsive to the user engagement level, thereby generating a modified media program for presentation to the user.

One or more aspects of the subject disclosure include a machine-readable storage medium comprising executable instructions that, when executed by a processing system including a processor, facilitate performance of operations. The operations comprise obtaining a user profile for a user of a media service, and selecting, in accordance with the user profile, program components for inclusion in a media program to be presented via the media service. The operations also comprise generating the media program using the selected program components, presenting the media program at equipment of the user, and obtaining sensor data associated with the user; the sensor data comprises real-time biometric data of the user including a facial expression of the user. The operations also comprise determining a user engagement level during presentation of the media program, based on the sensor data. The operations further comprise adjusting at least one of the program components responsive to the user engagement level, thereby generating a modified media program for presentation to the user.

FIG. 1 schematically illustrates a system 100 for dynamically providing personalized TV shows, in accordance with embodiments of the disclosure. A processing system 101 assembles a personalized TV show and transmits the show via network 110 for presentation on a display device 151. As shown in FIG. 1, the display device is located at a premises 150 that has several devices 180 for gathering data regarding the environment of premises 150, and also for monitoring program viewers 160, 170. In this embodiment, devices 180 include environmental sensors sending data via the Internet (the devices thus being connected to the "Internet of Things" or IoT).

The processing system 101 gathers environmental data regarding premises 150, and also gathers biometric data regarding the viewers 160, 170. In this embodiment, the viewers wear monitoring devices 161, 171 which can transmit each viewer's pulse rate, temperature, blood pressure, etc. Devices 180 can include a camera 185 which captures images of each viewer's facial expression; these images can be processed by system 101 to determine the viewer's mood at various times during presentation of the TV program.

A TV program is assembled using scene elements stored in database 102 accessible to system 101. The scene elements can include the setting, characters, plot, portions of dialog, etc.

In this embodiment, a TV program is personalized using profiles of the viewers, which are stored in database 104 accessible to system 101. Database 103 includes relatively static data regarding, for example, a viewer's personal background, home city, occupation, relationships, likes/dislikes, tolerance for strong language, etc. Database 103 also includes relatively dynamic biometric and environmental data (for example, from the IoT devices) that is collected in real time, used to assemble a TV show for presentation, and updated frequently during presentation of the show.

In order to make the show more engaging for the viewer, numerous content items can be included in the show according to the viewer's profile, the viewer's environment, and/or the viewer's physical/emotional state (determined by the real-time environmental and biometric data). These content items are stored in database 104 accessible to system 101, and can include (for example) voice profiles of the viewer or his family and friends, the viewer's favorite brands of various products, logos of the viewer's favorite sports teams, etc.

Figure 2:
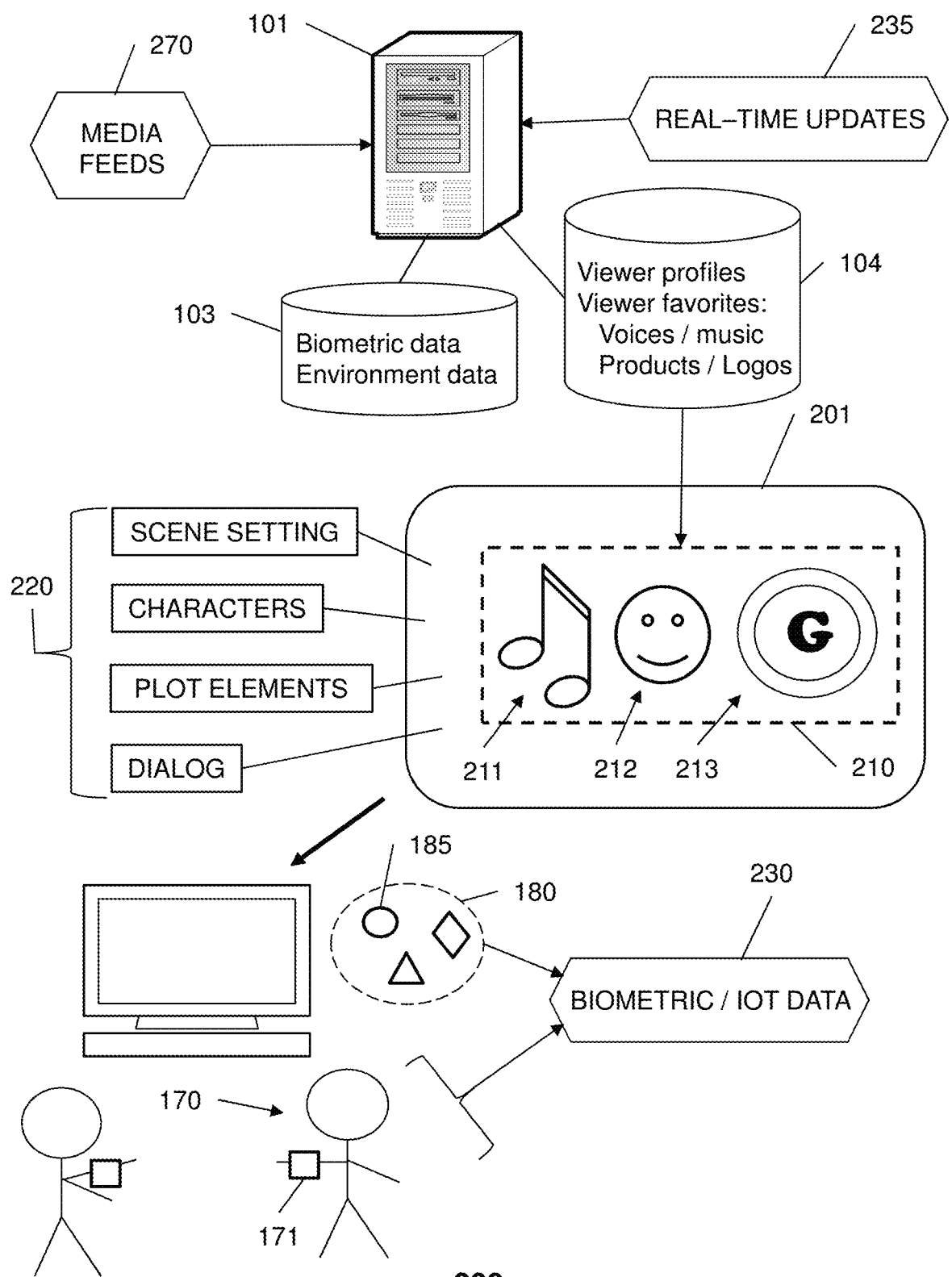
FIG. 2 schematically illustrates personalization of a TV show based on a predefined viewer profile, in accordance with an embodiment of the disclosure.

FIG. 2 depicts an illustrative embodiment 200 of the disclosure, in which a TV show is created, personalized and updated during presentation. In this embodiment, elements of a TV show are assembled based on a predefined viewer profile and a database of content items that permit personalization of the show. As shown in FIG. 2, a TV show (represented by a frame 201) generally includes elements 220 such as a scene setting, characters, plot, and dialog.

In this embodiment, the TV show is mostly pre-created (that is, ready to present to the viewer). Before beginning presentation of the show, system 101 accesses the viewer profile/preference database 104 for data such as the viewer's favorite baseball team, home city, favorite music genre, faces of the viewer's family members, etc. These personalized data elements can then be substituted for elements in the pre-created show. As shown in FIG. 2, the standard elements 220 of a show are combined with personalized elements 210 including music 211, characters' faces 212, sports logos 213, etc.

The show can be altered dynamically during presentation, in response to real-time updates 235 of environmental data and/or biometric data 230 indicating the viewer's emotional state (emotional data). In this embodiment, emotional data for a viewer 170 is gathered using a wearable biometric sensor 171 and IoT sensors 180. In particular, camera 185 can capture the viewer's facial expression in real time. The viewer's level of engagement with the show can be estimated by comparing the emotional data with an expected emotional response for a given portion of the show. For example, if a viewer's heart rate stays steady during what should be an exciting chase scene, or if camera 185 detects a facial expression indicating boredom, various elements of the show (e.g. audio volume, music tempo, background colors, etc.) can be adjusted in real time to increase the viewer's level of engagement. Similarly, if the viewer's facial expressions do not indicate amusement or laughter during a comedy, more amusing content can be inserted into the show.

In another embodiment, the presentation of the show can be dynamically adjusted to meet a predefined need of the viewer. For example, if the viewer or a provider of medical care has indicated that the viewer should not become overexcited or angry, the system can adjust the presentation if the real-time emotional data indicates a level of emotion above a predefined threshold. The emotional data can be combined with the viewer's profile data to provide insight regarding how to interpret the individual viewer's emotional response to the presentation. For example, crying could indicate extreme emotional upset for one viewer, but simply indicate a heartfelt response to the show by another viewer.

In another embodiment, information 270 from the viewer's media environment (e.g. social media feeds) can be input to the system 101 to help interpret the viewer's response to elements of the show, and/or adjust the presentation to avoid evoking a strong negative emotion. For example, if there has recently been a heavily reported shooting in the area, system 101 can alter a plot element to change a certain character's cause of death from a gunshot to a drug overdose.

Figure 3:
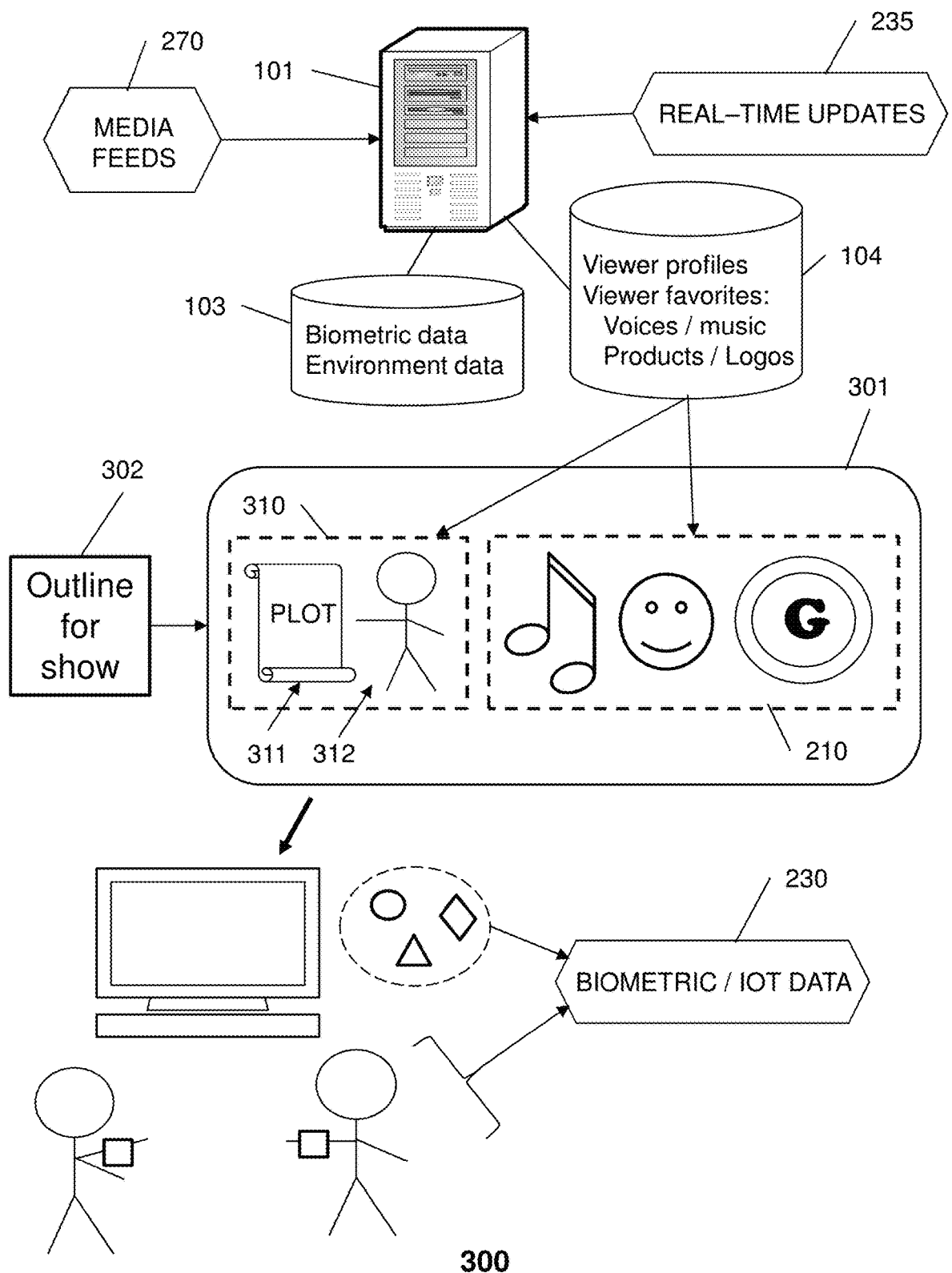
FIG. 3 schematically illustrates creation and personalization of a TV show based on a predefined outline and viewer preferences, in accordance with an embodiment of the disclosure.

FIG. 3 schematically illustrates creation and personalization of a TV show 301 based on a predefined outline and viewer preferences, in accordance with an embodiment 300 of the disclosure. In this embodiment, a content provider creates an outline 302 for a show without specifying the setting, characters, plot or dialog in advance. Basic features 310 of the show (e.g. plot 311 and character(s) 312) can be inserted into the outline according to the viewer's stored profile, the viewer's social media feeds, current biometric/environmental data relating to the viewer, and/or publicly available sources. Additional elements 210 can then be added to increase the viewer's level of engagement.

It will be appreciated that a show can be constructed based on the viewer's profile and preferences (relatively static data) and the viewer's present environment and/or emotional state (relatively dynamic data), without direct input by the viewer. Alternatively, the viewer may specify elements of a show by entering instructions or choosing from a menu via a user interface communicating with the system 101.

The quality of the show and the viewer's level of engagement generally depend on the amount and quality of information gathered by the processing system 101 before the show is presented to the user. In these embodiments (e.g. those shown in FIGS. 2-3), the system gathers environmental information, profile data (e.g. from database 104 but also from the cloud or the viewer's local system), and local area media or social media information. The system 101 also gathers emotional data regarding the viewer; in an embodiment, the system 101 incorporates both real-time biometric and/or IoT sensor data and emotional data for a specified recent period (e.g. the last 24 hours or the last week). In particular, the system can apply facial recognition and image analysis techniques to a viewer's facial expression at various times before the show is presented, to determine a viewer's emotional state during a period prior to presentation of the show.

Figure 4:
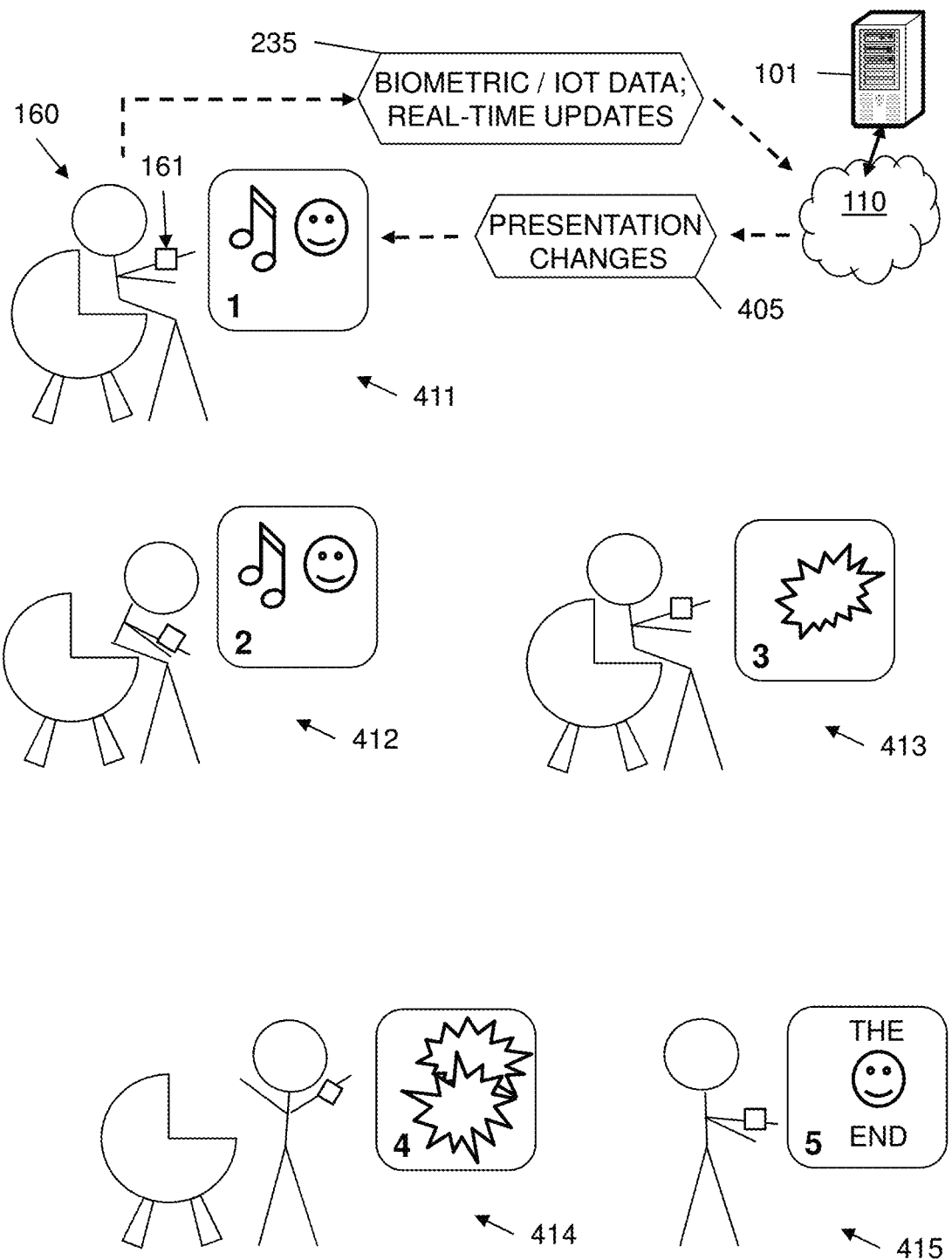
FIG. 4 schematically illustrates dynamic adaptation of a TV show using data obtained from the viewer, in accordance with an embodiment of the disclosure.

FIG. 4 schematically illustrates a viewer's experience 400 during presentation of a show, and dynamic adaptation of the show to optimize the viewer's enjoyment. As shown in FIG. 4, biometric data (for example, captured by wearable device 161) and/or IoT data are transmitted via network 110 to system 101, which then makes changes 405 to the program while it is presented.

At the beginning of the show 411, the viewer can be quickly engaged by music, faces, or other scene elements matching his profile (for example, the main character of the show, who resembles the viewer's brother, goes to a game played by the viewer's favorite team). At a later point in the show 412, the real-time updates indicate that the viewer has begun to lose interest (for example, the biometric data suggests that he has dozed off). The system responds by changing the presentation to include more exciting content 413. For example, the system may shorten a scene consisting mostly of dialog between two people, substitute the music for louder, faster music, and add a scene having an explosion or a high-speed chase. If at a later point 414 the viewer becomes too excited (that is, one or more of his pulse, blood pressure, respiration rate, etc. are outside of a predetermined normal range), the system can again alter the presentation to provide a calming effect (e.g. slow down the action and/or provide softer music).

At the end of the show 415, the viewer can provide feedback regarding his experience, for example by posting a comment on Facebook. The system 101 also updates the viewer's profile to include the viewer's reaction to the show. In this embodiment, changes to the presentation and updates to the profile can be performed in response to the environmental and biometric data, without direct input to system 101 by the viewer.

Figure 5:
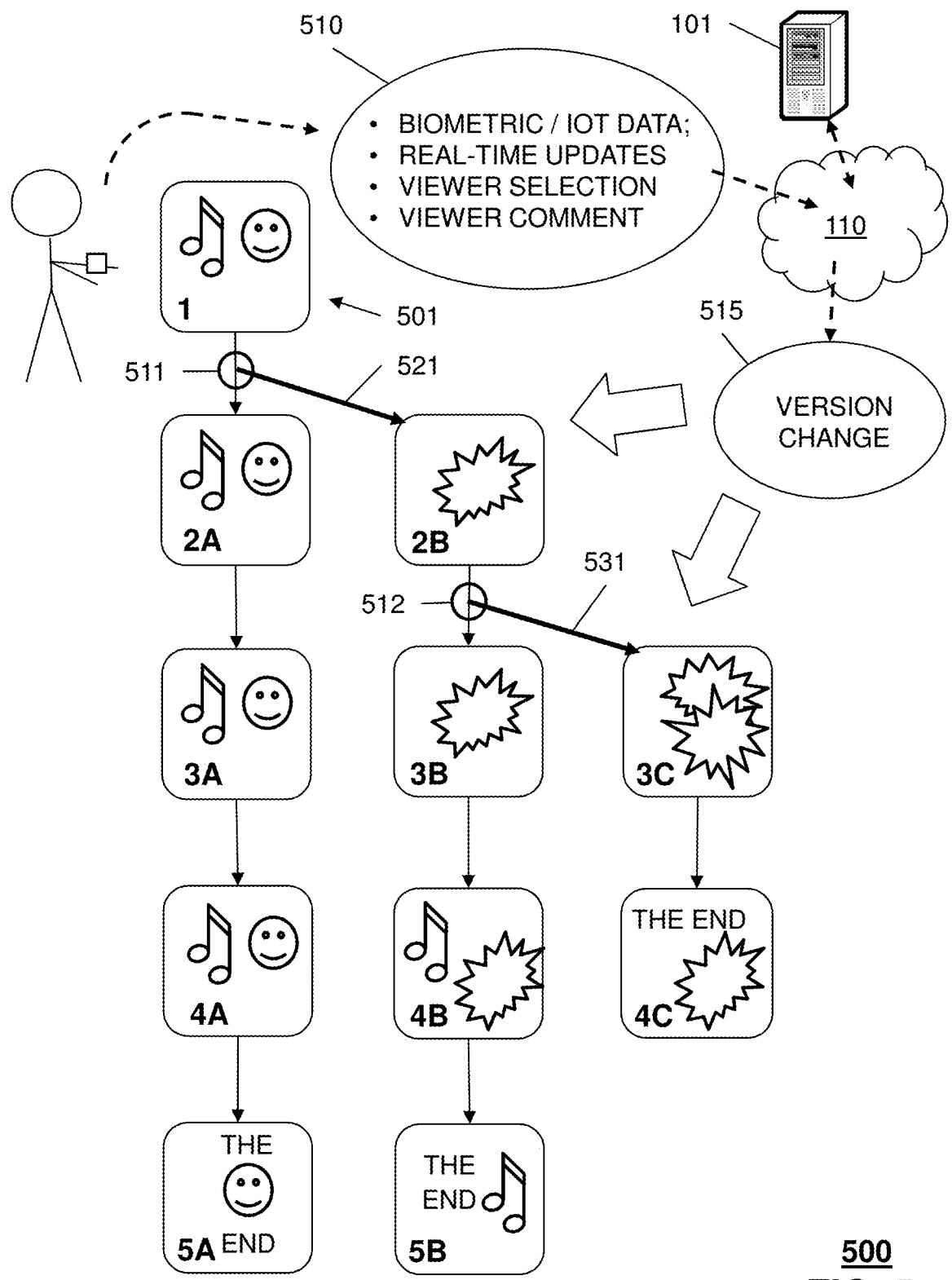
FIG. 5 schematically illustrates presenting alternative scenes of a TV show, based on viewer preferences and real-time data obtained from the viewer, in accordance with an embodiment of the disclosure.

In additional embodiments, system 101 can create a branching show 500 with multiple alternative versions. FIG. 5 schematically illustrates presenting alternative scenes of a TV show, based on viewer preferences and real-time data obtained from the viewer. As shown in FIG. 5, real-time updates of environmental and biometric data 510 relating to the viewer, along with selections and comments input by the viewer, are transmitted to the system 101 via network 110. The show is created with multiple versions of scenes, dialog, etc. prepared in advance. The system then can invoke version changes 515, causing the show to branch. Multiple branches at different points in the presentation can lead to a wide variety of possible shows.

The viewer watches the show (schematically illustrated as a sequence 501 of scenes 1, 2A, 3A, etc.) until a point 511 of the timeline of the show is reached (that is, transition from scene 1 to scene 2A). In order to present the most engaging show possible, the system can select a new branch 521 for the show in response to updated information 510; an alternate scene 2B is substituted for the upcoming scene 2A. A new sequence of scenes 2B, 3B, etc. is presented thereafter.

Criteria for branching can include the viewer's emotional state, the presence of more (or fewer) viewers with differing profiles, and/or direct input by the viewer. The system can select any number of further branches (e.g. branch 531 at time point 512, leading to a sequence 3C, 4C with more exciting content). As shown in FIG. 5, a given branch of the show may have a number of scenes (a duration of presentation) different from that of the original show.

In an embodiment, the viewer can choose in advance what emotion the show is to evoke; the system 101 then selects branching scenes to present a version that is likely to evoke that emotion. In another embodiment, the viewer can provide real-time comments during the presentation (e.g. via a smartphone app communicating with system 101) to cause branching; for example, the viewer can input "This comedy isn't very funny;" the system then can process and interpret the comment, and adjust the show by invoking branches leading to scenes including more jokes or sight gags, and thus likely to improve the viewer's experience.

Figure 6:
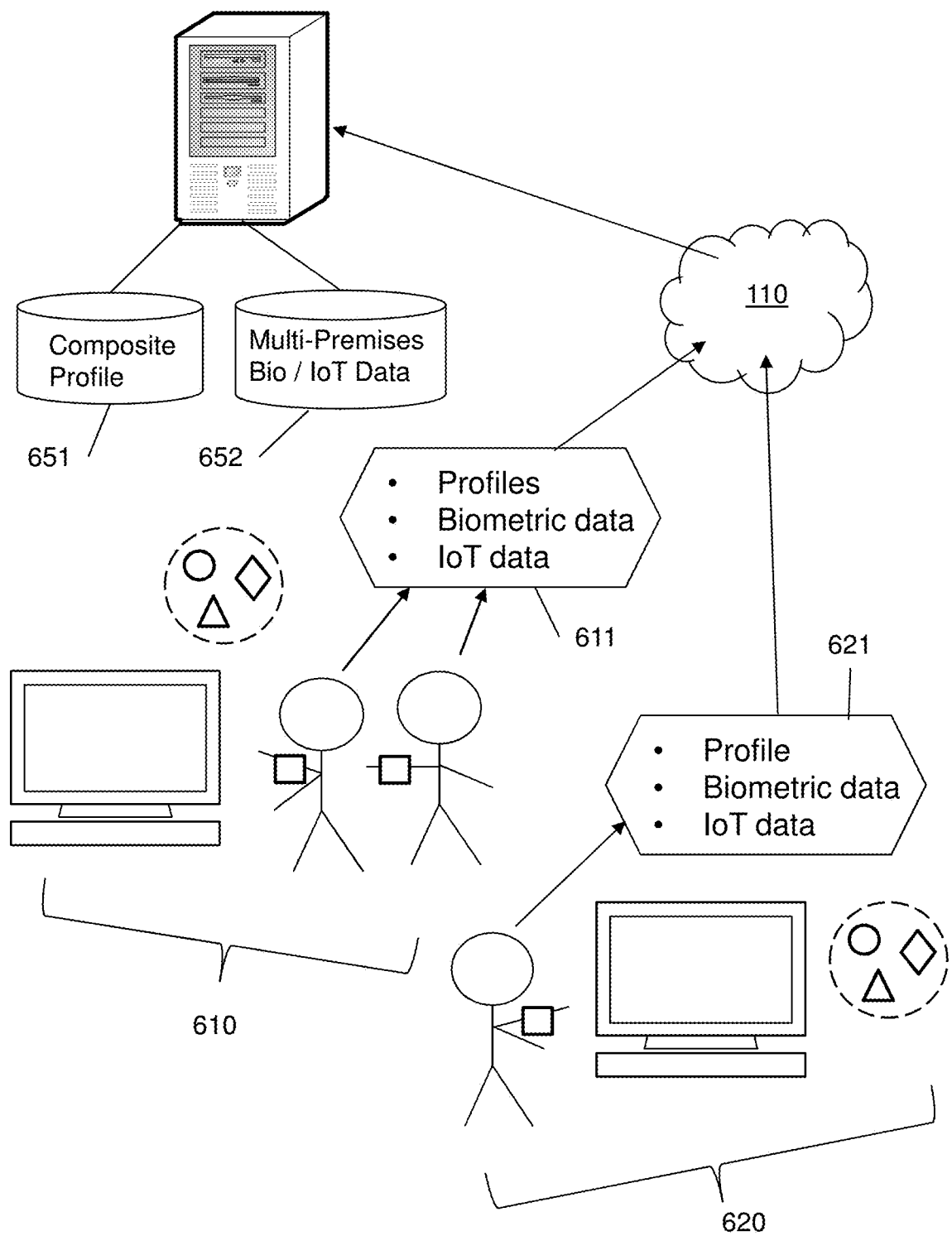
FIG. 6 schematically illustrates presenting a TV show to a group of viewers based on linked or aggregated viewer profiles, in accordance with an embodiment of the disclosure.

FIG. 6 schematically illustrates presenting a TV show to a group of viewers based on linked or aggregated viewer profiles, in accordance with an embodiment 600 of the disclosure. In this embodiment, multiple viewers at different locations 610, 620 wish to receive the same version of a show. Profiles of the viewers at location 610 and biometric/IoT data 611 are linked by system 101 with profiles of the viewer(s) at location 620 and biometric/IoT data 621. The system then can use a composite profile 651 and combined data 652 from both premises to create a show as described above.

During presentation of the show at locations 610, 620, the system gathers data from both locations and alters the presentation in the same manner for all of the viewers, to ensure that the viewers see the same version. In this embodiment, the system also aggregates viewer reactions/comments from both locations.

When a show is to be presented to multiple viewers (and thus created and dynamically altered in accordance with multiple linked profiles), each viewer's preferences may be given the same weight in developing the composite profile. Alternatively, the viewers may specify weighting factors for the individual profiles.

Figure 7:
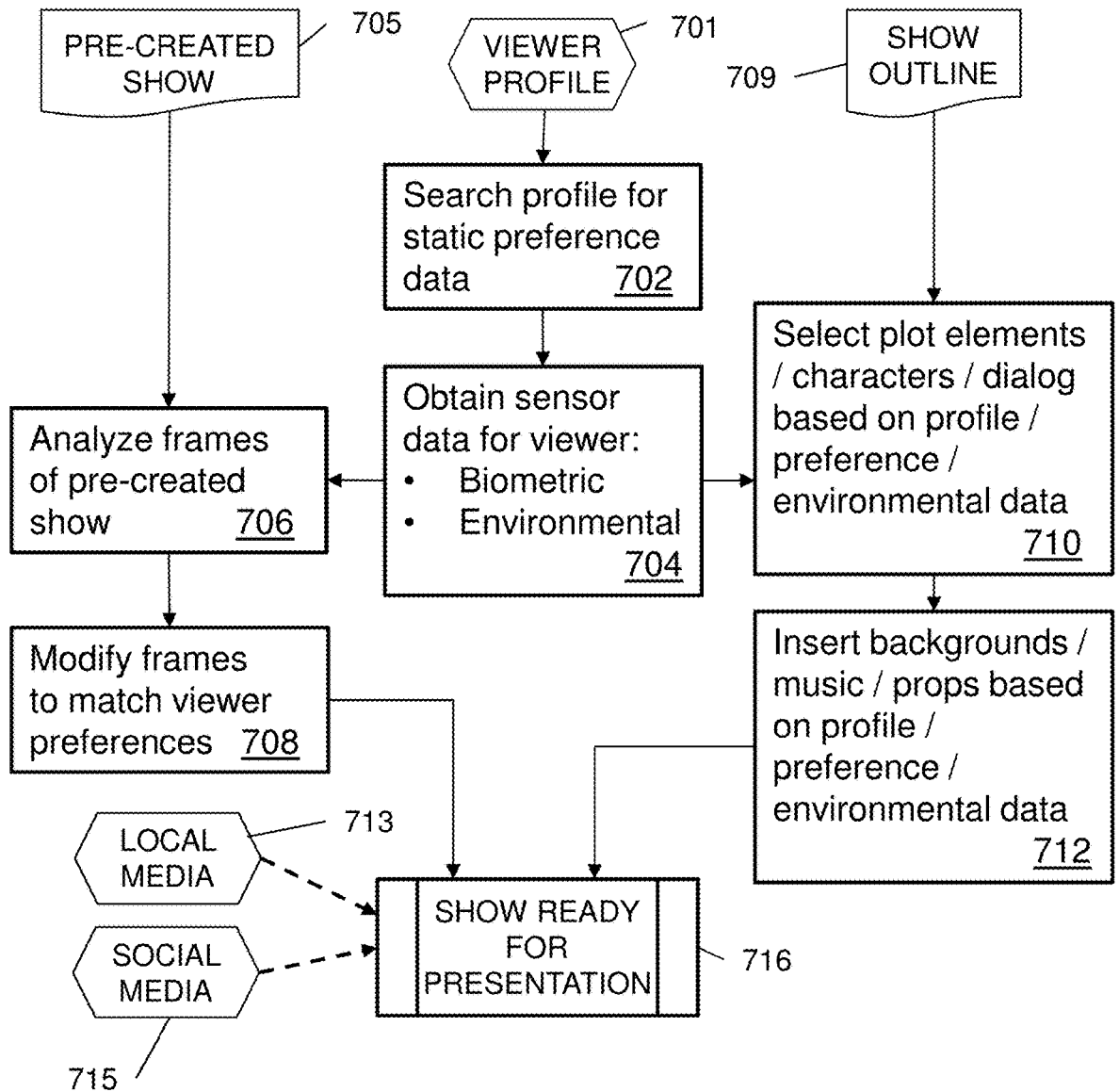
FIGS. 7-8 are flowcharts depicting methods for creating, personalizing, modifying and sharing TV shows, in accordance with embodiments of the disclosure.

FIG. 7 is a flowchart depicting a method 700 for creating, and personalizing a TV show, in accordance with embodiments of the disclosure. In step 702, a viewer profile 701 is accessed by a processing system which searches for the viewer's static preference data (home town, favorite teams, etc.). The system also obtains biometric and environmental data relating to the viewer (step 704). In the case of a pre-created show 705 that comprises a sequence of frames, the system analyzes the frames to identify elements for which other, viewer-preferred elements can be substituted (step 706). The system then modifies the frames (step 708) to more closely match the viewer's preferences and thus improve the viewer's experience of the show.

In the case of a show created from an outline 709, the system selects various basic show elements (plot, characters, scene, dialog, etc.) according to the viewer profile and the available biometric and environmental data (step 710). After selecting the basic elements, the system inserts additional elements based on the viewer's preferences and the available data regarding the viewer (step 712).

The system can also incorporate information from local media 713 and/or social media 715 to make the show more interesting to the viewer. The show is then ready for presentation (step 716).

Figure 8:
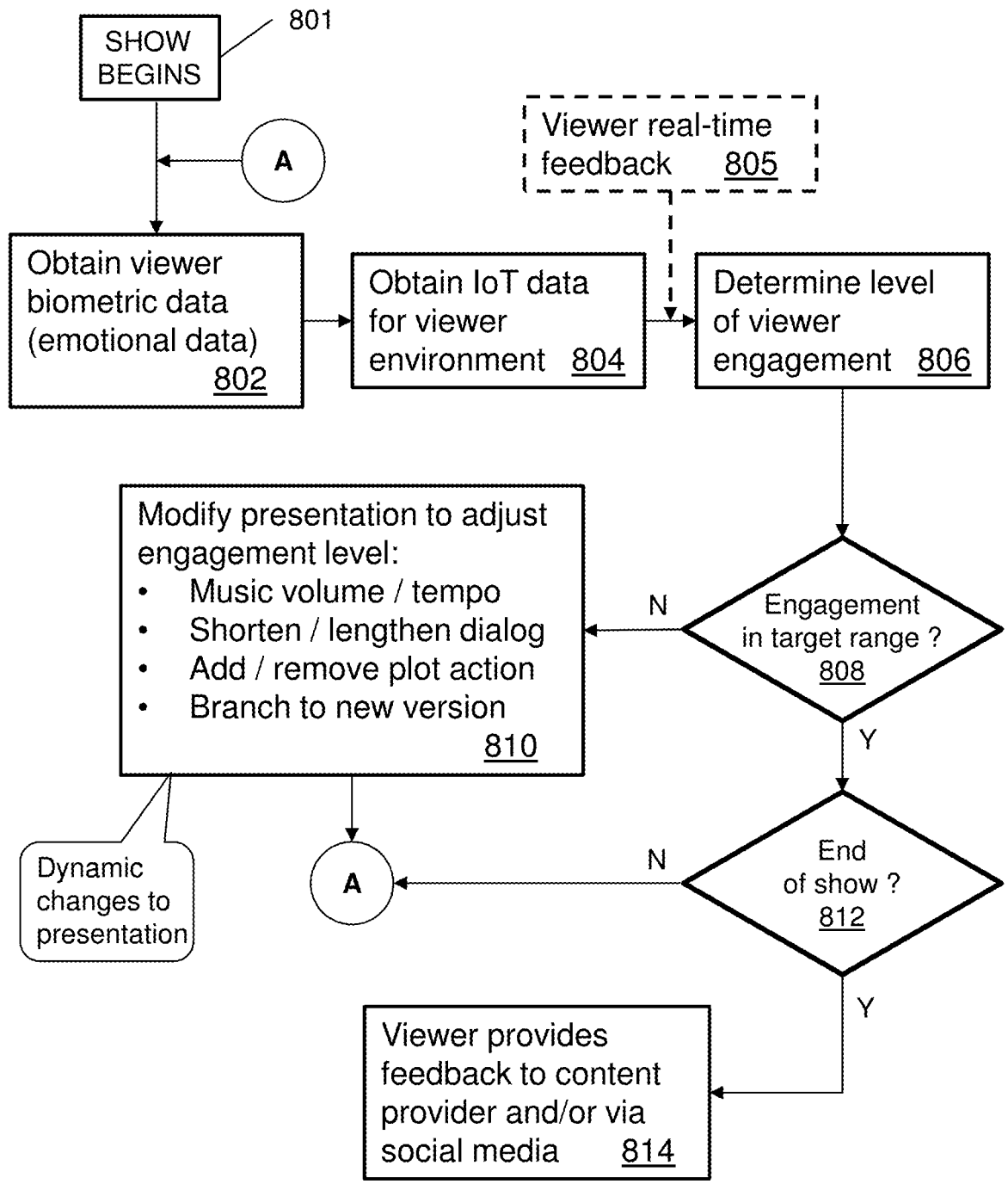

FIG. 8 is a flowchart depicting a method 800 for dynamically altering a TV show, in accordance with embodiments of the disclosure. The system initiates data collection as the show begins (step 801); the system gathers biometric data to determine the viewer's emotional state (step 802) and also gathers data (e.g. using IoT devices at the viewer's premises) regarding the viewer's environment (step 804). In an embodiment, the system may also receive the viewer's real-time comments regarding the show (step 805). This data is analyzed to determine a level of engagement for the viewer (step 806).

If the level of viewer engagement is not in a target range (that is, the viewer is inattentive or overexcited), the system modifies the presentation to adjust the level of engagement (step 810). This can be done by adding, changing or removing various elements of the presentation (e.g. adding a chase scene, removing dialog, raising the music volume). Alternatively, the system may invoke a branch to a different version of the show as described above.

The system continues to gather data and dynamically change the presentation until the end of the show (step 812). In step 814, the viewer provides feedback regarding his experience. In an embodiment, the viewer can direct comments to the content provider. In another embodiment, the viewer uses social media to make comments on the presentation.

While for purposes of simplicity of explanation, the respective processes are shown and described as a series of blocks in FIGS. 7-8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
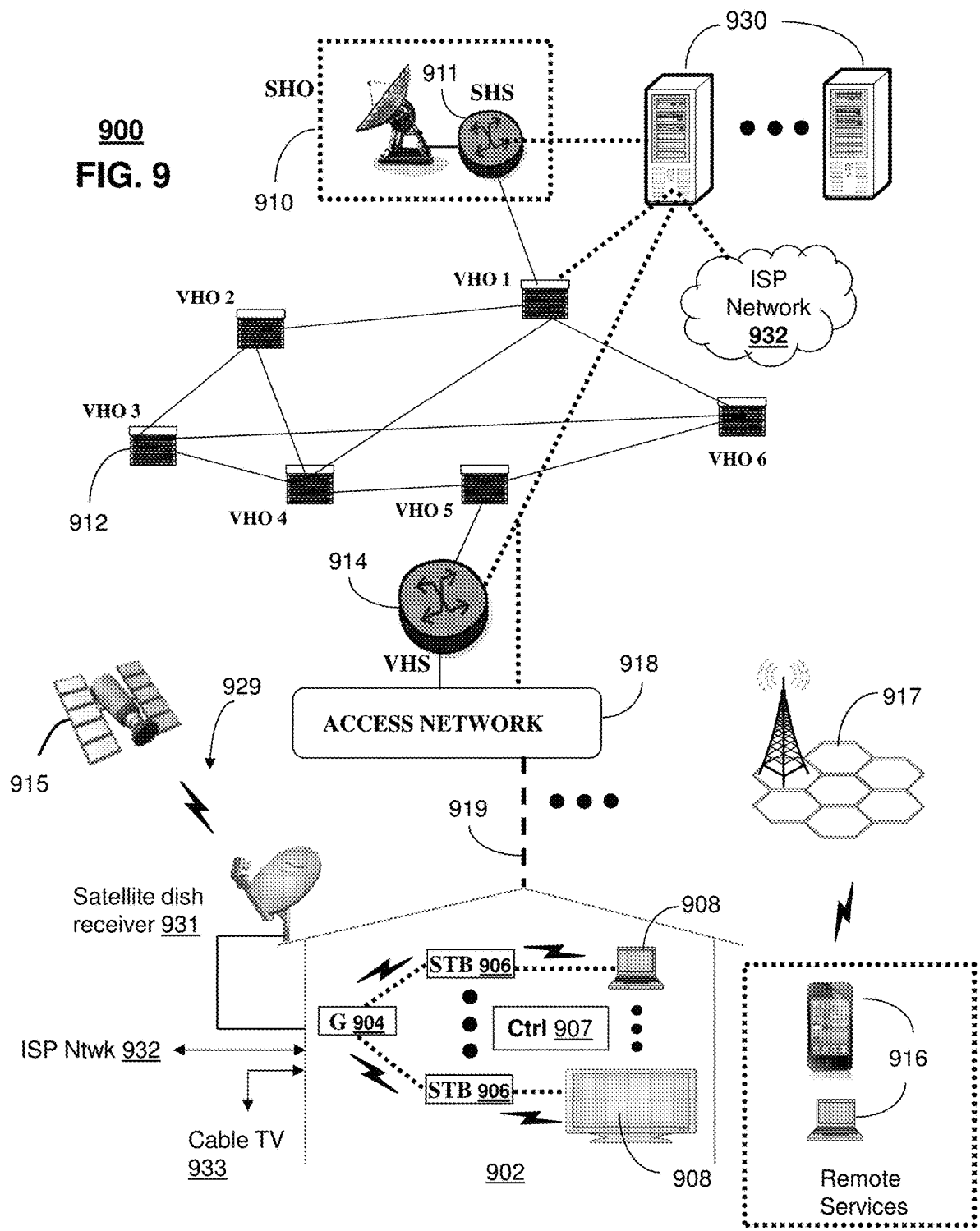
FIGS. 9-10 depict illustrative embodiments of communication systems that provide media services to the systems of FIGS. 1-6.

FIG. 9 depicts an illustrative embodiment of a communication system 900 for providing various communication services, such as delivering media content. The communication system 900 can represent an interactive media network, such as an interactive television system (e.g., an Internet Protocol Television (IPTV) media system). Communication system 900 can be overlaid or operably coupled with system 100 of FIG. 1 as another representative embodiment of communication system 900. For instance, one or more devices illustrated in the communication system 900 of FIG. 9 can comprise a processing system including a processor and a memory that stores executable instructions that, when executed by the processing system, facilitate performance of operations; the operations can comprise obtaining a user profile for a user of a media service, and selecting, in accordance with the user profile, program components for inclusion in a media program to be presented via the media service; the program components can comprise backgrounds, characters, plot elements, spoken dialogue, music, props, product placements, or combinations thereof. The operations can also comprise generating the media program using the selected program components, presenting the media program at equipment of the user, obtaining sensor data associated with the user, and determining a user engagement level during presentation of the media program, based on the sensor data. The operations can further comprise adjusting at least one of the program components responsive to the user engagement level, thereby generating a modified media program for presentation to the user.

In one or more embodiments, the communication system 900 can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol. The VHS 914 can distribute multimedia broadcast content via an access network 918 to commercial and/or residential buildings 902 housing a gateway 904 (such as a residential or commercial gateway).

The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a server (herein referred to as server 930) using computing communication technology to perform functions which can include, among other things, creating and dynamically altering a presentation to a viewer. For instance, functions of server 930 can be similar to the functions described for processing system 101 of FIG. 1 in accordance with methods 700 and 800. The media processors 906 and wireless communication devices 916 can be provisioned with software functions to utilize the services of server 930.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
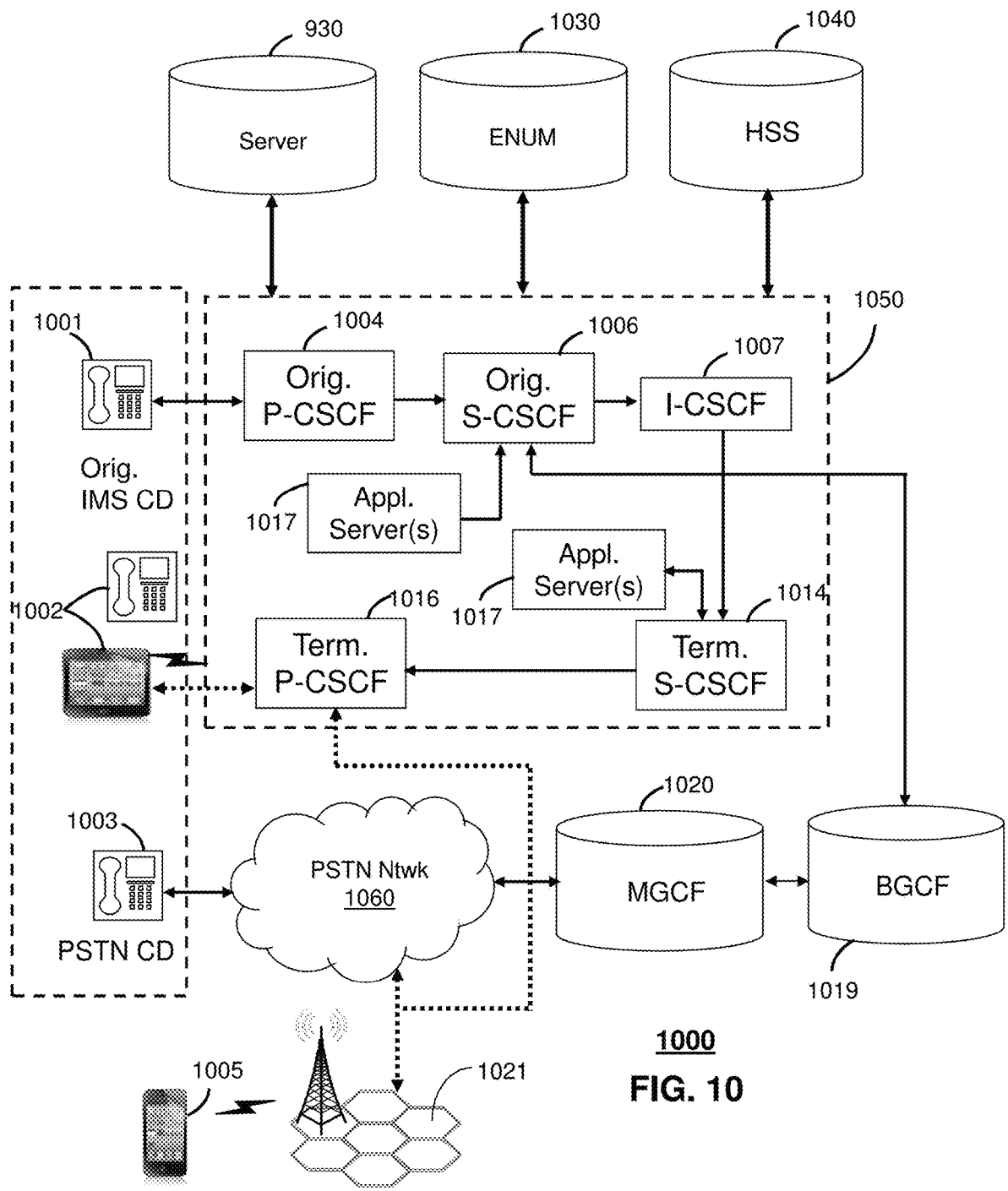

FIG. 10 depicts an illustrative embodiment of a communication system 1000 employing an IP Multimedia Subsystem (IMS) network architecture to facilitate the combined services of circuit-switched and packet-switched systems. Communication system 1000 can be overlaid or operably coupled with system 100 of FIG. 1 and communication system 900 as another representative embodiment of communication system 900. Communication system 1000 can perform a method that comprises obtaining a user profile for a user of a media service, and selecting, in accordance with the user profile, program components for inclusion in a media program to be presented via the media service. The method can also comprise generating the media program using the selected program components, and presenting the media program at equipment of the user. The method can also comprise obtaining sensor data associated with the user, and determining a user engagement level during presentation of the media program, based on the sensor data. The method can further comprise adjusting at least one of the program components responsive to the user engagement level, thereby generating a modified media program for presentation to the user.

Communication system 1000 can comprise a Home Subscriber Server (HSS) 1040, a tElephone NUmber Mapping (ENUM) server 1030, and other network elements of an IMS network 1050. The IMS network 1050 can establish communications between IMS-compliant communication devices (CDs) 1001, 1002, Public Switched Telephone Network (PSTN) CDs 1003, 1005, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1030 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 or CD 1005 (in instances where the cellular phone only supports circuit-switched voice communications), the ENUM system 1030 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices. In this embodiment, the cellular base station 1021 may communicate directly with the IMS network 1050 as shown by the arrow connecting the cellular base station 1021 and the P-CSCF 1016.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 930 of FIG. 9 can be operably coupled to communication system 1000 for purposes similar to those described above. Server 930 can provide services to the CDs 1001, 1002, 1003 and 1005 of FIG. 10, which can be adapted with software to utilize those services. Server 930 can be an integral part of the application server(s) 1017, which can be adapted to the operations of the IMS network 1050.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 11:
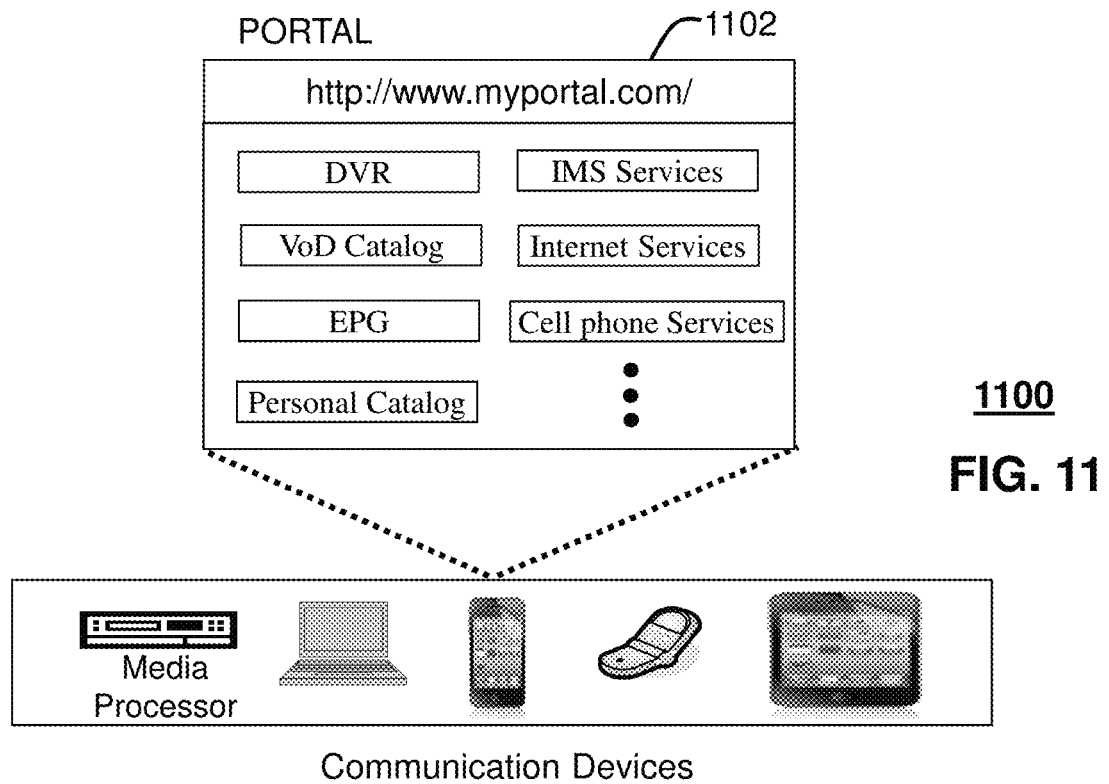
FIG. 11 depicts an illustrative embodiment of a web portal for interacting with the systems of FIGS. 1-6.

FIG. 11 depicts an illustrative embodiment of a web portal 1102 of a communication system 1100. Communication system 1100 can be overlaid or operably coupled with system 100 of FIG. 1, communication system 900, and/or communication system 1000 as another representative embodiment of system 100, communication system 900, and/or communication system 1000. The web portal 1102 can be used for managing services of system 100 and communication systems 900-1000. A web page of the web portal 1102 can be accessed by a Uniform Resource Locator (URL) with an Internet browser using an Internet-capable communication device. The web portal 1102 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1102 can also be used for provisioning IMS services described earlier, provisioning Internet services, provisioning cellular phone services, and so on.

The web portal 1102 can further be utilized to manage and provision software applications to adapt these applications as may be desired by subscribers and/or service providers of system 100 and communication systems 900-1000. For instance, users of the services provided by processing system 101 or server 930 (for example, subscribers to a content provider for personalized shows) can log into their on-line accounts and provision system 101 or server 930 with user profiles, provide contact information to enable communication with other viewers' devices, and so on. Service providers can log onto an administrator account to provision, monitor and/or maintain system 101 or server 930.

Figure 12:
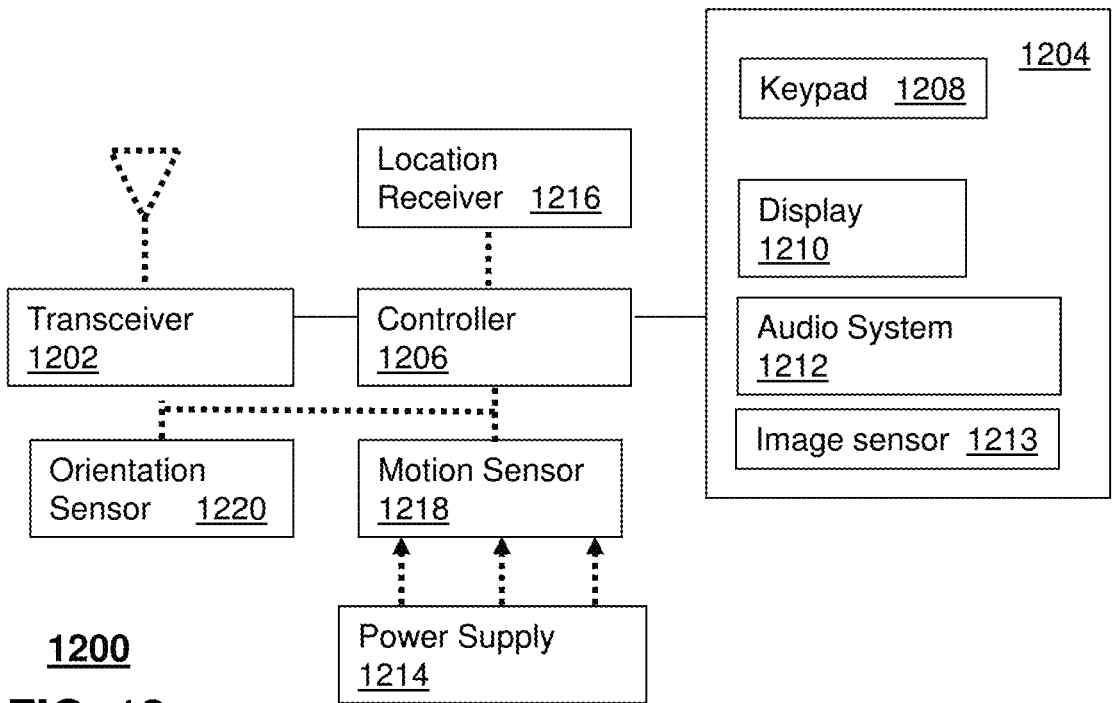
FIG. 12 depicts an illustrative embodiment of a communication device.

FIG. 12 depicts an illustrative embodiment of a communication device 1200. Communication device 1200 can serve in whole or in part as an illustrative embodiment of the devices depicted in FIGS. 1-6 and can be configured to perform portions of methods 700 and 800 of FIGS. 7-8.

Communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of devices of FIGS. 1-6, the media processor 906, the media devices 908, or the portable communication devices 916 of FIG. 9, as well as the IMS CDs 1001-1002 and PSTN CDs 1003-1005 of FIG. 10. It will be appreciated that the communication device 1200 can also represent other devices that can operate in system 100 or in communication systems 900-1000 of FIGS. 9-10 such as a gaming console and a media player.

Upon reviewing the aforementioned embodiments, it would be evident to an artisan with ordinary skill in the art that said embodiments can be modified, reduced, or enhanced without departing from the scope of the claims described below. For example, in one embodiment advertisements can be dynamically inserted into a presentation, with the content of the advertisement selected according to the viewer's profile. In another embodiment, the viewer's emotional data and/or environmental data can be transmitted to the content provider, either in real time or after the conclusion of the presentation.

In a further embodiment, a show can be created with scenes based entirely on the viewer profiles and real-time data associated with the viewer (a fully synthetic show). In this embodiment, a scene can be created in real time using characters whose every move and word is in response to emotional input from the viewer(s).

In a further embodiment, a movie can be created where the adjustments and branching choices can be more extensive than for a TV show. Because a movie is generally a one-time story as opposed to a series, the changes in content can permit a wide range of possible outcomes, as opposed to a TV series where one episode is expected to logically follow from another. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
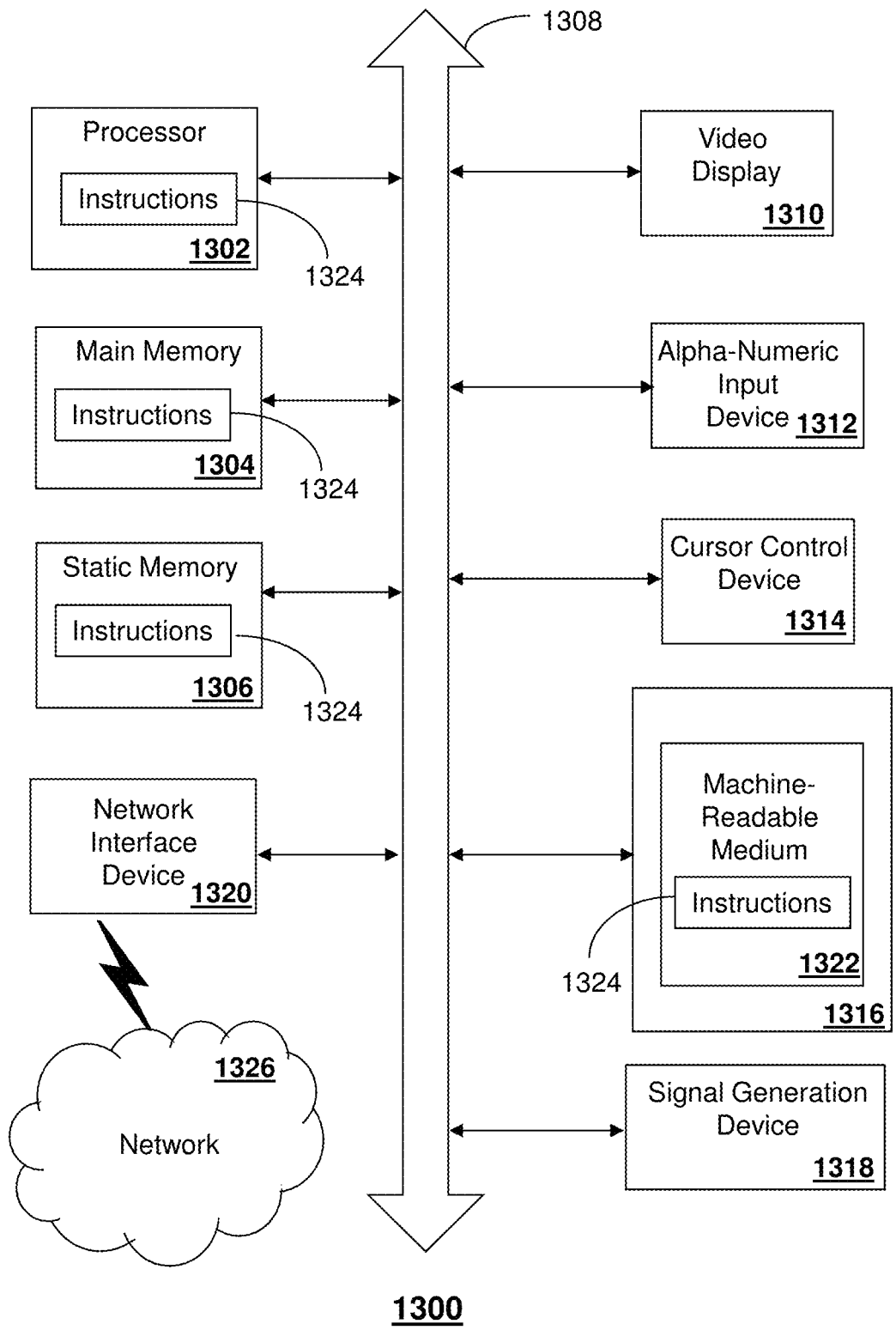
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. One or more instances of the machine can operate, for example, as the server 930, the media processor 906, the processing system 101 and other devices of FIGS. 1-6. In some embodiments, the machine may be connected (e.g., using a network 1326) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU)), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations comprising:
obtaining a user profile for a user of a media service;
selecting, in accordance with the user profile, program components for inclusion in a media program to be presented via the media service, wherein the program components comprise backgrounds, characters, plot elements, spoken dialogue, music, props, product placements, or combinations thereof;
generating the media program from the program components selected, thereby creating a presentable media program that can be presented via the media service;
presenting the presentable media program at equipment of the user;
obtaining sensor data associated with the user, wherein the sensor data comprises real-time biometric data of the user generated by a biometric sensor worn by the user;
determining a user engagement level during presentation of the presentable media program, based on the sensor data; and
adjusting at least one of the program components during presentation of the presentable media program responsive to the user engagement level, thereby generating a modified media program for presentation to the user, the modified media program accordingly not available prior to determination of the user engagement level,
wherein the presentable media program is presented at equipment of a plurality of users, wherein the plurality of users includes the user, and wherein the adjusting is performed responsive to a composite user engagement level for the plurality of users, the modified media program thereby presented at the equipment of each of the plurality of users,
wherein the user profile includes data regarding the user's: personal background, home city, occupation, relationships, likes, dislikes, and tolerance for strong language,
wherein the presentable media program includes a first voice profile of the user, a second voice profile of the user's family or friends, a logo of the user's favorite sports team, or any combination thereof, and
wherein the adjusting of the at least one of the program components is further responsive to an interpretation of a response of the user during the presenting of the presentable media program in accordance with information from a social media feed of the user and a report regarding an occurrence of an event.

2. The device of claim 1, wherein the sensor data comprises data transmitted by Internet of Things (IOT) sensors installed in an environment of the user.

3. The device of claim 1, wherein the user engagement level is determined in accordance with the real-time biometric data of the user.

4. The device of claim 3, wherein the user engagement level is determined based on a user pulse rate, a user blood pressure, a user respiration rate, or a combination thereof.

5. The device of claim 1, wherein the sensor data comprises a facial expression of the user during presentation of the media program.

6. The device of claim 1, wherein the adjusting is performed responsive to the user engagement level being outside a predetermined range.

7. The device of claim 1, wherein the media program comprises a sequence of scenes and a plurality of alternative scenes, and wherein the adjusting comprises substituting an alternative scene of the plurality of alternative scenes for an upcoming scene of the sequence of scenes.

8. The device of claim 7, wherein the substituting is performed a plurality of times during presentation of the media program.

9. The device of claim 1, wherein the media program is presented to the plurality of users at a premises, the user profile comprising a composite profile for the plurality of users, and wherein obtaining the sensor data comprises aggregating sensor data associated with each of the plurality of users.

10. The device of claim 1, wherein the media program is presented to the plurality of users at a plurality of premises, and wherein the adjusting is performed responsive to a composite user engagement level for the plurality of users.

11. A method comprising:
obtaining, by a processing system including a processor, a user profile for a user of a media service;
selecting, by the processing system in accordance with the user profile, program components for inclusion in a media program to be presented via the media service, wherein the program components comprise backgrounds, characters, plot elements, spoken dialogue, music, props, product placements, or combinations thereof;
generating, by the processing system, the media program from the program components selected, thereby creating a presentable media program that can be presented via the media service;
presenting, by the processing system, the presentable media program at equipment of the user;
obtaining, by the processing system, sensor data associated with the user, wherein the sensor data comprises real-time biometric data of the user generated by a biometric sensor worn by the user;
determining, by the processing system, a user engagement level during presentation of the presentable media program, based on the sensor data; and
adjusting, by the processing system, at least one of the program components during presentation of the presentable media program responsive to the user engagement level, thereby generating a modified media program for presentation to the user, the modified media program accordingly not available prior to determination of the user engagement level,
wherein the presentable media program is presented at equipment of a plurality of users, wherein the plurality of users includes the user, and wherein the adjusting is performed responsive to a composite user engagement level for the plurality of users, the modified media program thereby presented at the equipment of each of the plurality of users,
wherein the user profile includes data regarding the user's: personal background, home city, occupation, relationships, likes, dislikes, and tolerance for strong language,
wherein the presentable media program includes a first voice profile of the user, a second voice profile of the user's family or friends, and a logo of the user's favorite sports team, and
wherein the adjusting of the at least one of the program components is further responsive to an interpretation of a response of the user during the presenting of the presentable media program in accordance with information from a social media feed of the user, a report regarding an occurrence of an event, or a combination thereof.

12. The method of claim 11, wherein the user engagement level is determined in accordance with the real-time biometric data of the user.

13. The method of claim 11, wherein the sensor data comprises a facial expression of the user during presentation of the media program.

14. The method of claim 11, wherein the media program comprises a sequence of scenes and a plurality of alternative scenes, and wherein the adjusting comprises substituting an alternative scene of the plurality of alternative scenes for an upcoming scene of the sequence of scenes.

15. A non-transitory machine-readable medium comprising executable instructions that, when executed by a processing system including a processor, facilitate performance of operations comprising:
obtaining a user profile for a user of a media service;
selecting, in accordance with the user profile, program components for inclusion in a media program to be presented via the media service, wherein the program components comprise backgrounds, characters, plot elements, spoken dialogue, music, props, product placements, or combinations thereof;
generating the media program from the program components selected, thereby creating a presentable media program that can be presented via the media service;
presenting the presentable media program at equipment of the user;
obtaining sensor data associated with the user, the sensor data comprising real-time biometric data of the user generated by a biometric sensor worn by the user and including a facial expression of the user;
determining a user engagement level during presentation of the presentable media program, based on the sensor data; and
adjusting at least one of the program components during presentation of the presentable media program responsive to the user engagement level, thereby generating a modified media program for presentation to the user, the modified media program accordingly not available prior to determination of the user engagement level,
wherein the presentable media program is presented at equipment of a plurality of users, wherein the plurality of users includes the user, and wherein the adjusting is performed responsive to a composite user engagement level for the plurality of users, the modified media program thereby presented at the equipment of each of the plurality of users,
wherein the user profile includes data regarding the user's: personal background, home city, occupation, relationships, likes, dislikes, and tolerance for strong language, wherein the presentable media program includes a first voice profile of the user, a second voice profile of the user's family or friends, and a logo of the user's favorite sports team, and wherein the adjusting of the at least one of the program components is further responsive to an interpretation of a response of the user during the presentation of the presentable media program in accordance with information from a social media feed of the user and a report regarding an occurrence of an event.

16. The non-transitory machine-readable medium of claim 15, wherein the sensor data comprises data transmitted by Internet of Things (TOT) sensors installed in an environment of the user, wherein the media program comprises a sequence of scenes and a plurality of alternative scenes, and wherein the adjusting comprises substituting an alternative scene of the plurality of alternative scenes for an upcoming scene of the sequence of scenes.

17. The non-transitory machine-readable medium of claim 15, wherein the media program is presented to the plurality of users at a premises, the user profile comprising a composite profile for the plurality of users, and wherein obtaining the sensor data comprises aggregating sensor data associated with each of the plurality of users.

* * * * *

UNITED STATES PATENT AND TRADEMARK OFFICE
CERTIFICATE OF CORRECTION

PATENT NO. : 11,070,862 B2
APPLICATION NO. : 15/631397
DATED : July 20, 2021
INVENTOR(S) : Sarah Everett, Gregory W. Edwards and Marc Sullivan Page 1 of 1

It is certified that error appears in the above-identified patent and that said Letters Patent is hereby corrected as shown below:

In the Claims

In Claim 16, Column 21, Line 13, please delete "(TOT)", insert -- (IOT) --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*